US007620935B2

(12) United States Patent
Baisley et al.

(10) Patent No.: US 7,620,935 B2
(45) Date of Patent: *Nov. 17, 2009

(54) GENERATING PROGRAMMATIC INTERFACES FROM NATURAL LANGUAGE EXPRESSIONS OF AUTHORIZATIONS FOR REQUEST OF INFORMATION

(75) Inventors: Donald Edward Baisley, Laguna Hills, CA (US); Ravi Anthony Joseph Dirckze, Mission Viejo, CA (US); Jonathan Virgil Ziebell, Trabuco Canyon, CA (US); Russel Elliot Cole, Laguna Niguel, CA (US)

(73) Assignee: Microsoft Corporation, Redmond, WA (US)

( * ) Notice: Subject to any disclaimer, the term of this patent is extended or adjusted under 35 U.S.C. 154(b) by 771 days.

This patent is subject to a terminal disclaimer.

(21) Appl. No.: 10/837,299

(22) Filed: Apr. 30, 2004

(65) Prior Publication Data

US 2005/0246371 A1 Nov. 3, 2005

(51) Int. Cl.
*G06F 9/44* (2006.01)
*G06F 9/45* (2006.01)
*G06F 17/28* (2006.01)

(52) U.S. Cl. .............................. 717/108; 704/2; 704/9; 717/106; 717/136

(58) Field of Classification Search .............. 717/110, 717/116, 106–109, 136–137; 719/328; 707/5, 707/513; 704/10, 260, 1–2, 9
See application file for complete search history.

(56) References Cited

U.S. PATENT DOCUMENTS

| 4,974,191 | A | * | 11/1990 | Amirghodsi et al. ........... 704/8 |
| 5,167,009 | A | * | 11/1992 | Skeirik ........................ 706/23 |
| 5,197,005 | A | * | 3/1993 | Shwartz et al. ................. 707/2 |
| 5,748,974 | A | * | 5/1998 | Johnson ......................... 704/9 |
| 5,907,840 | A | * | 5/1999 | Evans ............................ 707/5 |
| 6,023,669 | A | | 2/2000 | Suda |
| 6,173,441 | B1 | * | 1/2001 | Klein ......................... 717/142 |
| 6,523,172 | B1 | | 2/2003 | Martinez-Guerra |
| 6,587,849 | B1 | * | 7/2003 | Mason et al. ................... 707/5 |
| 6,640,207 | B2 | | 10/2003 | Witschel |
| 6,754,321 | B1 | | 6/2004 | Innes |
| 6,763,341 | B2 | | 7/2004 | Okude |
| 6,789,252 | B1 | | 9/2004 | Burke |
| 7,185,016 | B1 | | 2/2007 | Rasmussen |
| 7,233,915 | B2 | | 6/2007 | Metcalfe |
| 7,356,522 | B2 | | 4/2008 | Herrera |
| 2002/0107889 | A1 | * | 8/2002 | Stone et al. .................. 707/513 |
| 2002/0120917 | A1 | * | 8/2002 | Abrari et al. ................ 717/110 |
| 2003/0097363 | A1 | | 5/2003 | Dorsey |

(Continued)

OTHER PUBLICATIONS

Perex-Gonzalez et al. "GOOAL: A graphic Object Oriented Analysis Laboratory" Nov. 2002, AMC OOPSLA '02, pp. 38-39.*

(Continued)

*Primary Examiner*—Jason Mitchell
(74) *Attorney, Agent, or Firm*—Workman Nydegger

(57) ABSTRACT

An embodiment of the present invention is a technique for processing an authorization rule. An object type is created for a return type of an operation in the rule authorizing a request for information. A current container is established. A propositional expression in the rule is processed to record the object type as a resulting context from the propositional expression in the current container.

12 Claims, 8 Drawing Sheets

U.S. PATENT DOCUMENTS

| | | | | |
|---|---|---|---|---|
| 2003/0216919 | A1* | 11/2003 | Roushar | 704/260 |
| 2004/0030421 | A1 | 2/2004 | Haley | |
| 2004/0210445 | A1 | 10/2004 | Veronese | |
| 2005/0096908 | A1 | 5/2005 | Bacchiani | |
| 2005/0108001 | A1* | 5/2005 | Aarskog | 704/10 |
| 2005/0289560 | A1* | 12/2005 | Sedogbo et al. | 719/328 |
| 2006/0026576 | A1 | 2/2006 | Baisley | |

OTHER PUBLICATIONS

Evans "A comparison of Rule-Based and Machine Learning Methods for Identifying non-nominal It", 2000, NPL 2000, LNCS 1835, pp. 233-240.*

Bryant et al, From Natural Language Requirements to Executable Models of Software Components, Sep. 24, 2003, 8 pages.

Donald Baisley and Peter Cunningham, Business Transformation Utilizing Business Rule Technologies, Dec. 2, 2003, 18 pages.

L. Mich et al, NL-OOPs: A Requirements Analysis Tool based on Natural Language Processing, 2002, 11 pages.

Terry Halpin, Information modeling and Relational Database from Conceptual Analysis to Logical Design, pp. 412-454, Moragan Kaufmann Publishers, 2001.

Office Action dated Dec. 12, 2007 cited in related U.S. Appl. No. 10/837,299.

Office Action dated Oct. 19, 2007 cited in related U.S. Appl. No. 10/899,891.

Office Action dated Jun. 27, 2008 cited in related U.S. Appl. No. 10/899,891.

Related U.S. Appl. No. 10/860,672, filed Jun. 3, 2004 (Not Published).

Halpin, "Object Role Modeling: An Overview", Microsoft White Paper, Nov. 2001, Available at: http://msdn.microsoft.com/en-us/library/aa290383.aspx.

Office Action dated Oct. 5, 2007 cited in U.S. Appl. No. 10/831,679.

Office Action dated Jul. 10, 2008 cited in U.S. Appl. No. 10/831,679.

Office Action dated Nov. 28, 2007 cited in U.S. Appl. No. 10/903,452.

Notice of Allowance dated Nov. 3, 2008 cited in U.S. Appl. No. 10/860,672.

Office Action dated Nov. 14, 2008 cited in U.S. Appl. No. 10/903,452.

Office Action dated Dec. 16, 2008 cited in U.S. Appl. No. 10/831,679 (Copy Attached).

Office Action dated Jan. 7, 2009 cited in U.S. Appl. No. 10/899,891 (Copy Attached).

* cited by examiner

GENERATING PROGRAMMATIC INTERFACES FROM NATURAL LANGUAGE EXPRESSIONS OF AUTHORIZATIONS FOR REQUEST OF INFORMATION

CROSS-REFERENCE TO RELATED APPLICATIONS

This application is related to the following patent application Ser. No. 10/836,822 entitled "Generating Programmatic Interfaces From Natural Language Expressions Of Authorizations For Provision Of Information", filed on the same date and assigned to the same assignee as the present application, the contents of which are herein incorporated by reference.

BACKGROUND

1. Field of the Invention

Embodiments of the invention are in the field of natural language processing, and relate more specifically to programmatic interfaces from natural language expressions.

2. Description of Related Art

Natural language used by human to communicate tends to be contextual and imprecise. To automate natural language processing using computerized methods, certain rules are usually imposed to confine the natural language expressions to a well-defined format. There are several applications that can provide an environment where natural language expressions may be expressed in an unambiguous format. One such application is business rules.

When business services or transactions are automated in a computer system, business rules provide business requirements on the automated system. These requirements dictate what the system should and should not do, or who can provide information to the system and who can request information from the system. However, the process of translating business rules expressed in business language into software components using human software developers tends to be error-prone and time-consuming. Automatic generation of software systems from business rules will save time and avoid the problem of errors that would occur in manual translation.

SUMMARY OF THE INVENTION

An embodiment of the present invention is a technique to process an authorization rule. An object type is created for a return type of an operation in the rule authorizing a request for information. A current container is established. A propositional expression in the rule is processed to record the object type as a resulting context from the propositional expression in the current container.

BRIEF DESCRIPTION OF THE DRAWINGS

The invention may best be understood by referring to the following description and accompanying drawings that are used to illustrate embodiments of the invention. In the drawings.

DESCRIPTION

Figure 1:
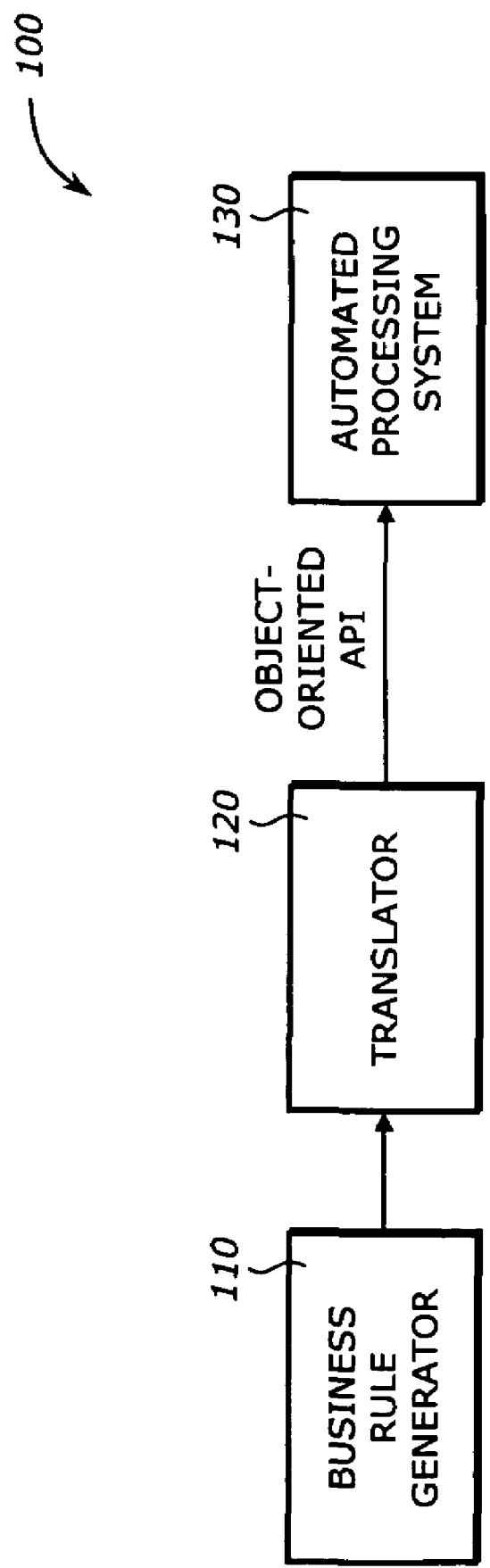
FIG. 1 is a diagram illustrating a system in which one embodiment of the invention can be practiced.

An embodiment of the present invention is a technique to process an authorization rule. An object type is created for a return type of an operation in the rule authorizing a request for information. A current container is established. A propositional expression in the rule is processed to record the object type as a resulting context from the propositional expression in the current container.

In the following description, numerous specific details are set forth. However, it is understood that embodiments of the invention may be practiced without these specific details. In other instances, well-known circuits, structures, and techniques have not been shown in order not to obscure the understanding of this description.

An embodiment of the present invention considers the part of an authorization rule that expresses what information may be requested, apart from any consideration of who requests it or conditions under which it may be requested. The method of the present invention examines propositional expressions of the authorization rule with respect to use of propositional interrogative operators, interrogative operators and parametric operators.

Many relevant linguistic concepts are used in the following description. These concepts are developed using a linguistic terminology that includes a number of terms. These terms include "expression", "nominal expression", "term", "name", "numerical literal", "textual literal", "role expression", "sentence", "simple sentence", "complex sentence", "functional form", "sentential form", "parametric operator", "interrogative operator", "propositional interrogative", "identification scheme", "type", "category", "role", "supertype", and "subtype".

An expression is a symbol or combination of symbols that means something. The meaning can be anything, including a proposition, a rule, a number, etc.

A nominal expression is a category of expression that names a thing or things.

A term is a category of symbol, a symbol that denotes being of a type, i.e., a common noun. Examples: "car" denoting a category of vehicle, "bank account".

A name is a category of symbol and of nominal expression; a symbol that names an individual thing, i.e., a proper noun. Examples: "California" naming a state of the United States, "Unisys" naming the company Unisys.

A numerical literal is a category of name that denotes a number using numerals. For example, "123" meaning the number 123.

A textual literal is a category of symbol and of nominal expression; a symbol that represents words, punctuation, textual characters or a sequence of any of these by literal presentation, as in quotation marks. For example, "hello" representing the word "hello".

A role expression is a category of nominal expression. A nominal expression consists primarily of a term given in place of a placeholder in an expression based on a functional form, and consists secondarily of each operator (e.g., quantifier, pronominal operator, parametric operator, interrogative operator) and object modifier applied to the term together with any expression of instances specifically referenced by the term, or, if the denoted type's range is restricted using a nominal restrictive form, that nominal restrictive form along with the expression of each argument to the function delineated by that form. Examples: "a checking account" in the expression "a checking account has the overdraw limit ($1000.00)"; "the overdraw limit ($1000.00)" in the expression "a checking account has the overdraw limit ($1000.00)".

A sentence is a category of expression; an expression that denotes a proposition (possibly an open or interrogative proposition).

A simple sentence is a category of sentence; a sentence that is stated using a single sentential form—no logical connectives. It includes a nominal expression for each placeholder of the sentential form. Example: "Each person has a name".

A complex sentence is a category of sentence. It is a sentence that combines other sentences using a logical connective such as if, and, or, etc. Example: "Each American citizen has a name and a social security number".

A functional form is a category of symbol and of expression; a complex symbol that is a sequence of typed placeholders and words interspersed that delineates a function and serves as a form for invoking the function in expressions. Each typed placeholder appears in the sequence as a term denoting the placeholder's type specially marked in some way (such as by underlining).

A sentential form is a category of functional form that delineates a propositional function. Example: "vendor charges price for product".

A parametric operator is a category of operator that when expressed with a term denotes a discourse referent determined by future discourse context, with singular quantification. Example: "a given" in "Each medical receptionist is authorized to provide what doctor sees a given patient".

An interrogative operator is a category of operator that when expressed with a term in a role expression denotes a discourse referent determined by future discourse context. The role expression is thereby a name for satisfiers in the encompassing sentence. Examples: the operator "what" in "What doctor sees what patient", the operators "which" and "what" in "Which doctor sees what patient". Note that "what" carries the meaning of "who", "when", "how", "where", "why", etc. when used as an operator on a term, e.g., in "what person", "what time" or "what date", "what method", "what location", "what purpose", etc.

A propositional interrogative is a category of operator that when expressed with a proposition denotes the truth-value of the proposition with regard to future discourse context. Example: the operator "whether" in "whether each doctor is licensed".

An identification scheme is a scheme by which a thing of some type can be identified by facts about the thing that relate the thing to signifiers or to other things identified by signifiers. The identifying scheme comprises of the set of terms that correspond to the signifiers. Example: an employee may be identified by employee number.

A type is a classification of things (often by category or by role). A category is a role of a type in a categorization relation to a more general type. The category classifies a subset of the instances of the more general type based on some delimiting characteristic. Example: checking account is a category of account.

A role is a role of a type whose essential characteristic is that its instances play some part, or are put to some use, in some situation. The type classifies an instance based, not on a distinguishing characteristic of the instance itself (as with a category), but on some fact that involves the instance. Example: destination city is a role of a city.

A supertype is a role of a type used in relation to another type such that the other type is a category or role of the supertype, directly or indirectly. Each instance of the other type is an instance of the supertype. Examples: animal is a supertype of person (assuming person is a category of animal) and person is a supertype of driver (assuming driver is a role of a person).

A subtype is a role of a type used in relation to another type such that the subtype is a category or role of the other type, directly or indirectly. Each instance of the subtype is an instance of the other type. This is the inverse of supertype. Examples: person is a subtype of animal (assuming person is a category of animal) and driver is a subtype of person (assuming driver is a role of a person).

In one embodiment, the invention is implemented using object-oriented technique. The object-oriented technique is a method to represent a system using objects and associations between objects. The technique involves the use of "class", "association", "attribute", and "operation". Although these terms are commonly known, they are defined in the following for clarification.

A class is an abstract concept representing a real world thing of interest to the system, such as a person, a router in a network, etc. A class is a template that defines the behavior and attributes that particular type of object possesses. A class can be the base for other classes. The behavior of the object is the collective set of operations that the object can perform, which are defined in respective class. The state of the object is defined by the values of its attributes at any given time.

An association represents a relationship between objects.

An attribute represents some aspect of an object. For example, the color of an automobile, the date of birth of a person. Each attribute has a type that defines the range of values that the attribute can have.

An operation represents a behavior that an object possesses.

A business rule that authorizes requests for information by a business actor indicates what information can be provided to the business actor. Such indications build on three linguistic concepts: (1) propositional interrogatives, (2) interrogative operators, and (3) parametric operators. These concepts are easily exemplified in English or other languages. The following are some examples in English.

Propositional interrogative: "A bank manager may request whether at least one account is suspended." In this example, the word "whether" is a propositional interrogative for the proposition "an account is suspended". This rule allows a bank manager to request the answer to the yes/no question "whether at least one account is suspended".

Interrogative operator: "A bank manager may request what account is suspended." In this example, the word "what" is an interrogative operator acting on the term "account" in the scope of the proposition "account is suspended". This rule allows a bank manager to request a list of accounts which are suspended.

Parametric operator: "A bank manager may request whether a given account is suspended.", "A bank manager may request which loan officer is assigned to a given loan." A parametric operator is used to indicate where a requestor indicates what thing is being asked about. In the two examples above, the word "given" is a parametric operator acting on the terms "account" and "loan", respectively. The first rule allows a bank manager to request the answer to a yes/no question about any particular account that the bank manager specifies—whether that account is suspended. The second allows a bank manager ask a question about a loan that the bank manager specifies—what loan officer is assigned to it.

The third concept can be used in combination with either of the first two, but the first two concepts are distinct in usage and are not mixed except when using conjunction (explained below). For example, a propositional interrogative (like "whether") is not used in an authorization rule on a proposition containing an interrogative operator (like "what"). However, multiple interrogative operators can occur in a single proposition. For example: "A bank manager may request which loan officer is assigned to what loan." In the above example, "which" and "what" are both interrogative operators indicating that a bank manager can request a list of assignments of loan officers to loans.

Similarly, parametric operators can be used multiple times in a single proposition: "A bank manager may request whether a given loan officer is assigned to a given loan." In this example, "a given" is a parametric operator indicating that both a loan officer and a loan are identified by a bank manager when requesting information.

It is possible for a rule to be conditioned on other information. For example, the rule above could be conditioned: "A bank manager may request whether a given loan officer is assigned to a given loan if the loan is with a bank managed by the bank manager."

The condition does not affect what information can be requested other than to limit the circumstances in which the request is allowed. Such conditions do not change affect the interface of a software component that dispenses the information, but only the behavior of the component—whether or not it will accept a request for information. For this reason, conditions placed on authorization rules can be ignored in the method of the present invention.

Note that the three linguistic concepts above are represented by many different words in English (e.g. "which" for "what") and by many different words in other languages. The present invention does not consider specific words, but the three specific linguistic concepts categorized above.

A single authorization rule can use conjunction in order to authorize multiple kinds of information. Example: "A bank manager may request what credit limit is on a given account and whether the account is suspended." The rule above uses the word "and" to indicate conjunction, which causes authorization to be granted, in this case, for two kinds of facts. Note that conjunction can occur using other words or forms. It is a general linguistic concept found in all languages.

One embodiment of the invention translates request interrogatives to object-oriented (OO) application programming interfaces (APIs). Each business rule that authorizes a request for information results in a single operation in an OO API. Each operation takes one or more parameters as arguments and returns a single object as a result. The type of the returned object, the number of parameters and the type of each parameter is determined in the operations described below.

FIG. 1 is a diagram illustrating a system 100 in which one embodiment of the invention can be practiced. The system 100 includes a business rule generator 110, a translator 120, and a business processing system 130. The system 100 may be implemented by software or hardware, or a combination of hardware and software.

The business rule generator 110 generates business rules to be used in the business processing system 130. These business rules are in a linguistic form having a predefined syntax or format. In one embodiment, these business rules may represent authorizations to request or to provide information.

The translator 120 translates the business rules generated from the business rule generator 110 into application programmatic interfaces (APIs) that can be incorporated into the automated processing system 130. The APIs represent software components that can be readily integrated into the framework of the business processing system 130.

The business processing system 130 processes the business rules encoded as the APIs provided by the translator 120. The business processing system 130 may represent any system that process commercial or business transactions such as product ordering, vacation planning, etc.

Elements of one embodiment of the invention may be implemented by hardware, firmware, software or any combination thereof. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described above. The machine accessible medium may also include program code embedded therein. The program code may include machine readable code to perform the operations described above. The term "data" here refers to any type of information that is encoded for machine-readable purposes. Therefore, it may include program, code, data, file, etc.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. A loop or iterations in a flowchart may be described by a single iteration. It is understood that a loop index or loop indices or counter or counters are maintained to update the associated counters or pointers. In addition, the order of the operations may be re-arranged. A process is terminated when its operations are completed. A process may correspond to a method, a program, a procedure, etc.

An embodiment of the invention performs the translation of a business rule, e.g., an authorization rule, into object-oriented application programmatic interfaces (OO APIs). The technique may be described by the following pseudo code.

Block-1: Process the Authorization Rule
1. Create an object type for the return type of the operation
2. Create an operation for the authorization whose return type is the object type created in step-1
3. Establish a variable, current-container
4. For each propositional expression in the rule describing requested information
    4.1 Set the current-container to be the object type for the return type
    4.2 If a propositional interrogative is applied to the propositional expression then
        4.2.1 process the expression as stated in block-2
    4.3 otherwise, if the propositional expression includes an interrogative operator
        4.3.1 process the expression as stated in block-3
    4.4 record that the object type in the current-container is the resulting context from the propositional expression Block-2: Parse a Propositional Expression to which a Propositional Interrogative is Applied.
1. Establish a context for the propositional expression following the steps in block-5
2. Process each role expression in the propositional expression
    2.1 For each role expression that is not a pronominal reference and that includes no definite article or expression of specifically referenced instances, reading in logical order
        2.1.1 If the role expression has a parametric operator,
            2.1.1.1 Generate an object type for the term in the role expression as stated in block-4
            2.1.1.2 Add a parameter whose type is the object type generated for the term (in step 2.1.1.1 above) to the operation being created.
3. Process the truthfulness of the propositional interrogative
    3.1 Add a Boolean attribute to the object type designated by the current-container to indicate whether the proposition is true or false Block-3: Parse a Propositional Expression Containing a Term to which an Interrogative Operator is Applied.
1. Establish a context for the propositional expression following the steps in block-5
2. Process each role expression in the propositional expression
    2.1 For each role expression that is not a pronominal reference, reading in the logical order
        2.1.1 If the role expression has a parametric operator,
            2.1.1.1 Generate an object type for the term in the role expression as stated in block-4
            2.1.1.2 Add a parameter whose type is the object type generated for the term (in step 2.1.1.1 above) to the operation being created.
        2.1.2 otherwise, if the role expression contains an interrogative operator
            2.1.2.1 Generate an object type for the term in the role expression as stated in block-4
            2.1.2.2 Add an attribute to the object type designated by the current-container whose attribute type is a collection of objects of the object type generated for the term (in step 2.1.2.1).
            2.1.2.3 Set the current-container to the object-type generated for the term (in step 2.1.2.1)

Block-4: Generating an Object Type for a Term
1. Create an object type
2. For each term in the identification scheme of the term
    2.1 If the term has a numerical or lexical type
        2.1.1 Add an attribute of the numerical or lexical type to the generated object type
    2.2 Otherwise,
        2.2.1 Generate an object type for the term as stated in block-4
        2.2.2 Add an attribute whose attribute type is the object type generated in the previous step (step 2.2.1) to the object type created in step 1

Block-5: Establish a Context for a Propositional Expression
1. Find each pronominal reference in the propositional expression whose referent is a term in a previously processed propositional expression, but exclude each referent whose referent is the subject of a parametric operator.
2. If a pronominal reference is found (in step 1 above), then
    2.1 Select the last processed propositional expression having a referent term from step 1.
    2.2 If any referent term in that last processed propositional expression is not the subject of an interrogative operator
        2.2.1 Set the current-container to be the object type that is the resulting context from that propositional expression
    2.3 Otherwise, the last referent term found in step 1 is the subject of an interrogative operator
        2.3.1 Set the current-container to be the object type generated for that last referent term.

Figure 2:
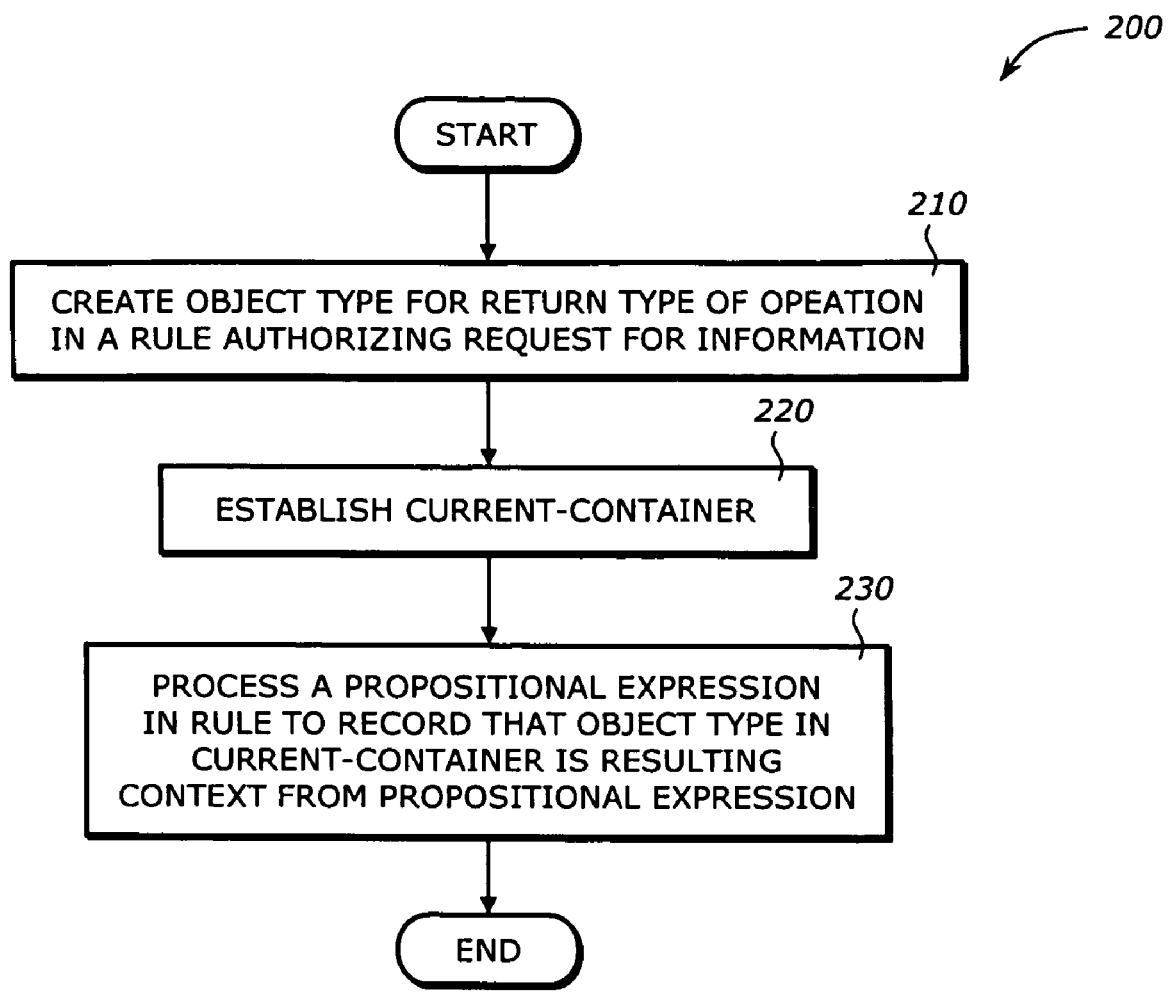
FIG. 2 is a flowchart illustrating a process to translate business rules into application programmatic interface (API) according to one embodiment of the invention.

FIG. 2 is a flowchart illustrating a process 200 to translate business rules into application programmatic interface (API) according to one embodiment of the invention. The process 200 implements the translator 120 shown in FIG. 1.

Upon START, the process 200 creates an object type for the return type of an operation in a rule authorizing a request for information (Block 210). Next, the process 200 establishes a variable called a current container (Block 220). Then, the process 200 processes a proposition expression in the rule to record that the object type in the current container is the resulting context from the proposition expression (Block 230). The process 200 is then terminated.

Figure 3:
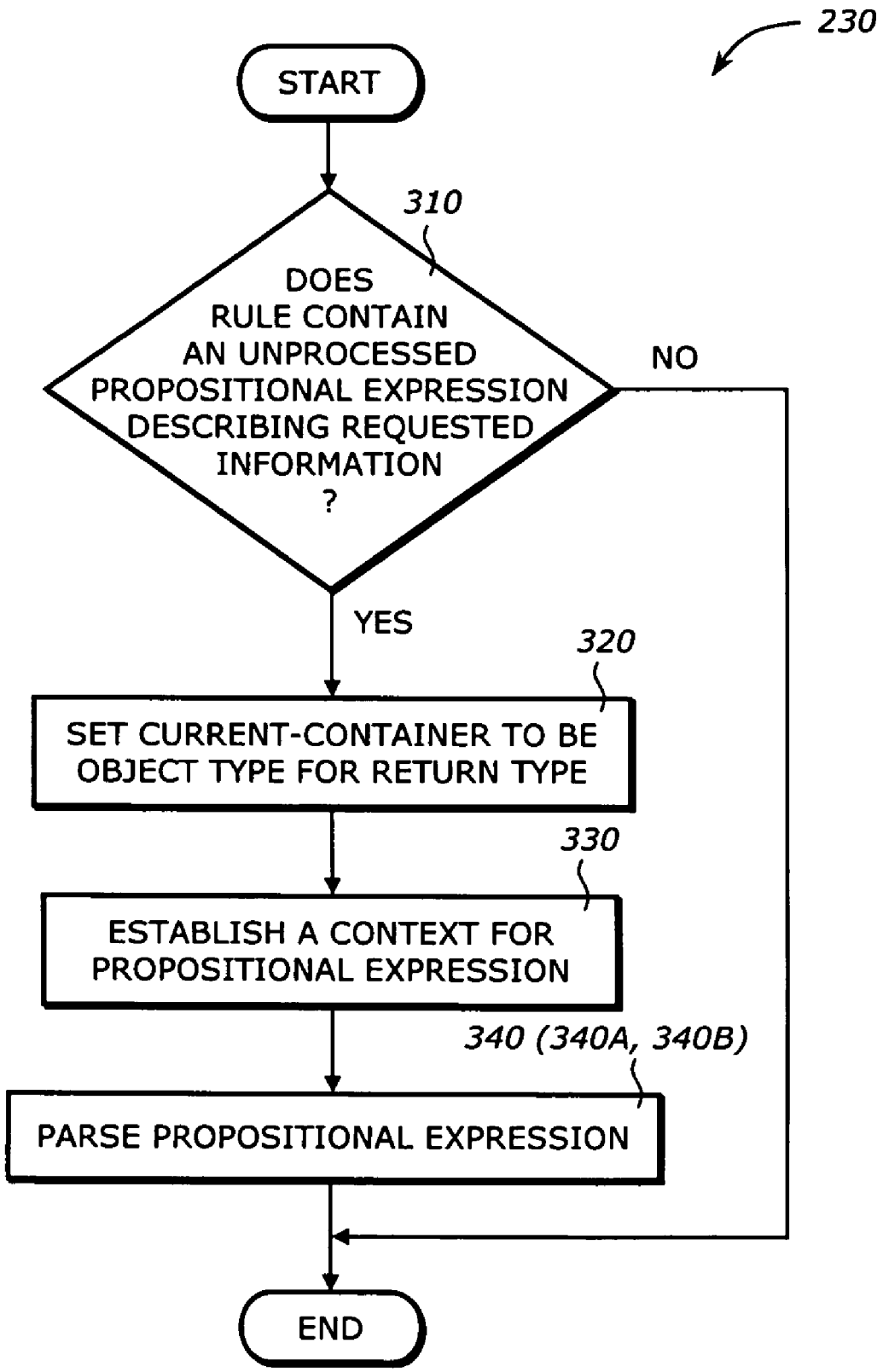
FIG. 3 is a flowchart illustrating a process to process a propositional expression according to one embodiment of the invention.

FIG. 3 is a flowchart illustrating a process 230 to process a propositional expression according to one embodiment of the invention.

Upon START, the process 230 determines if the rule contain an unprocessed propositional expression describing the requested information (Block 310). If not, the process 230 is terminated. Otherwise, the process 230 proceeds to set the current container to be the object type for the return type (Block 320).

Next the process 230 establishes a context for the propositional expression (Block 330). Then, the process 230 parses the propositional expression (Block 340 including two parts 340A and 340B) and is then terminated.

Figure 4:
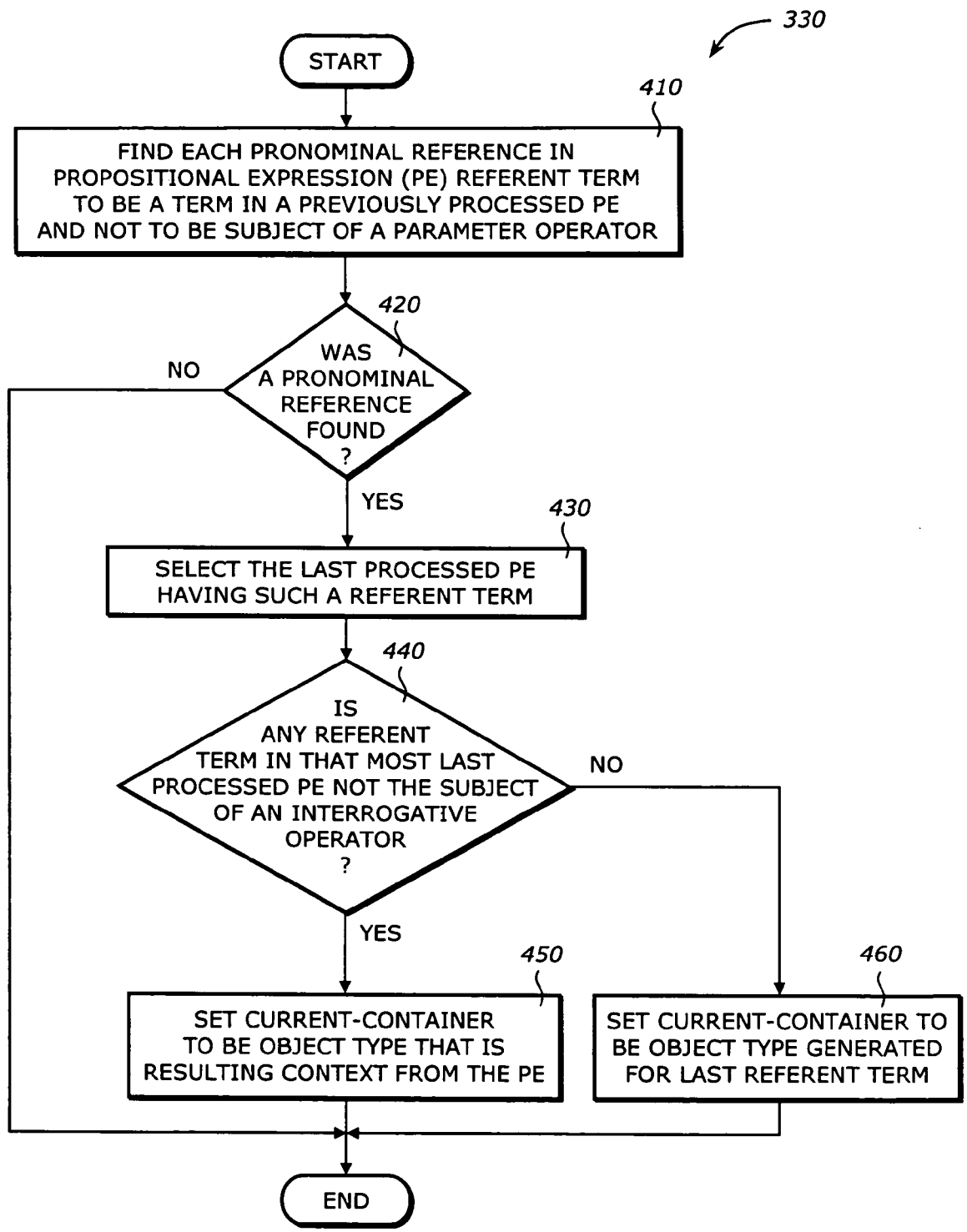
FIG. 4 is a flowchart illustrating a process to establish a context for the propositional expression according to one embodiment of the invention.

FIG. 4 is a flowchart illustrating a process 330 to establish a context for the propositional expression according to one embodiment of the invention.

Upon START, the process 330 finds each pronominal reference in the propositional expression (PE) having a referent term to be a term in a previously processed propositional expression, and not to be a subject of a parametric operator (Block 410). Next, the process 330 determines if such a pronominal reference was found (Block 420). If not, the process 330 is terminated. Otherwise, the process 330 selects the last processed propositional expression having such a referent term (Block 430). Then, the process 330 determines if any referent term in that last processed PE is not the subject of an interrogative operator (Block 440). If so, the process 330 sets the current container to be the object type that is the resulting context from the PE (Block 450) and is then terminated. Otherwise, the process 330 sets the current container to be the object type generated from the last referent term (Block 460) and is then terminated.

Block 340 of the process 230 (FIG. 3) for parsing the propositional expression comprises two processes, 340A and 340B.

Figure 5:
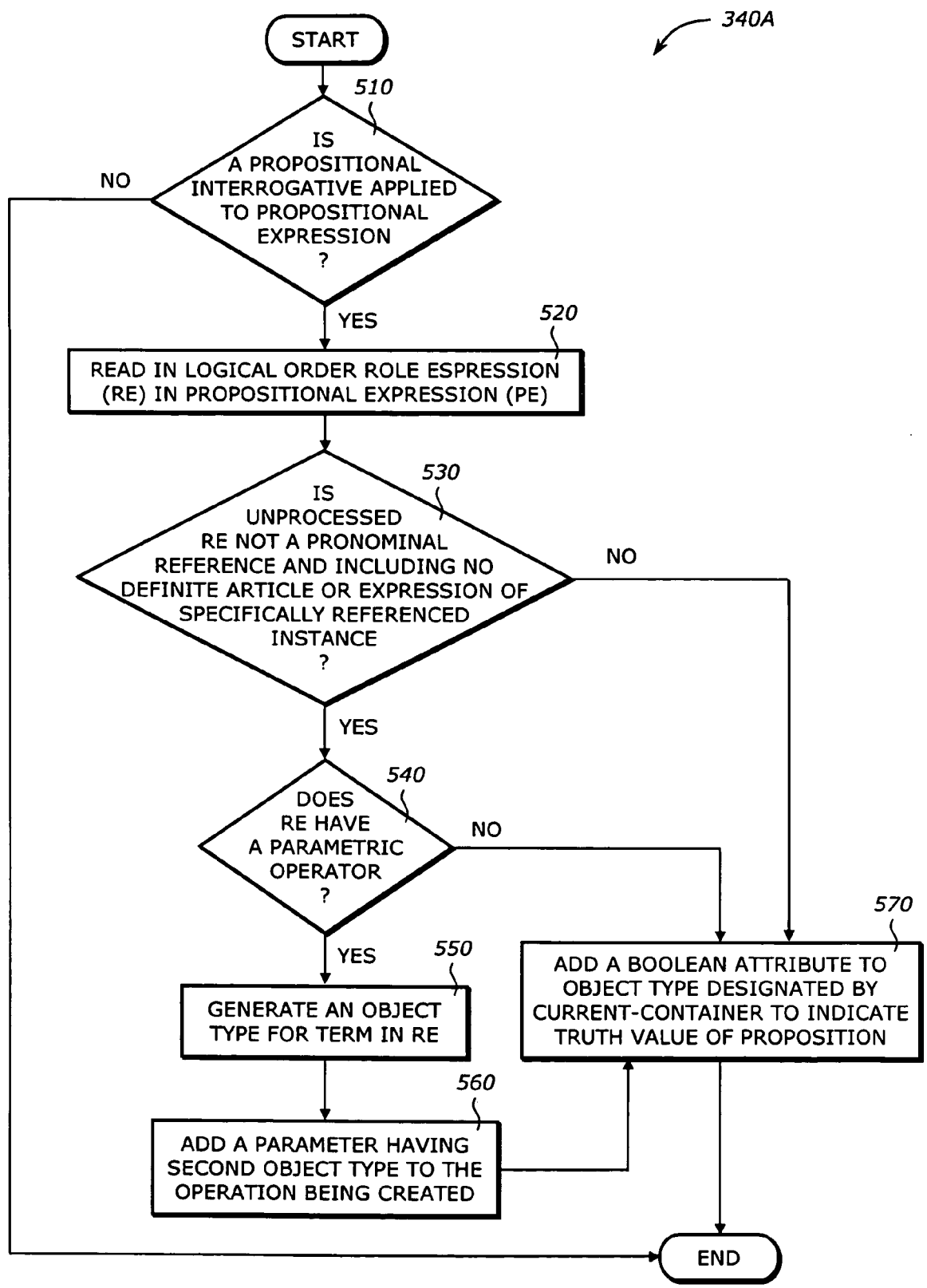
FIG. 5 is a flowchart illustrating a process to parse the propositional expression if the propositional interrogative is applied according to one embodiment of the invention.

FIG. 5 is a flowchart illustrating a process 340A to parse the propositional expression if the propositional interrogative is applied according to one embodiment of the invention.

Upon START, the process 340A determines if a propositional interrogative is applied to the propositional expression (Block 510). If not, the process 340A is terminated. Otherwise, the process 340A reads in logical order a role expression in the PE (Block 520). Next, the process 340A determines if the unprocessed role expression is not a pronominal reference and including no definite article or expression of a specifically referenced instance (Block 530). If not, the process 340A proceeds to Block 570. Otherwise, the process 340A determines if the role expression have a parametric operator (Block 540). If not, the process 340A proceeds to Block 570. Otherwise, the process 340A generates a second object type for the term in the role expression (Block 550).

Next, the process 340A adds a parameter having the second object type to the operation being created (Block 560). Then, the process 340A adds a Boolean attribute to the object type designated by the current container to indicate a truth value (i.e., true or false) of the propositional expression (Block 570) and is then terminated.

Figure 6:
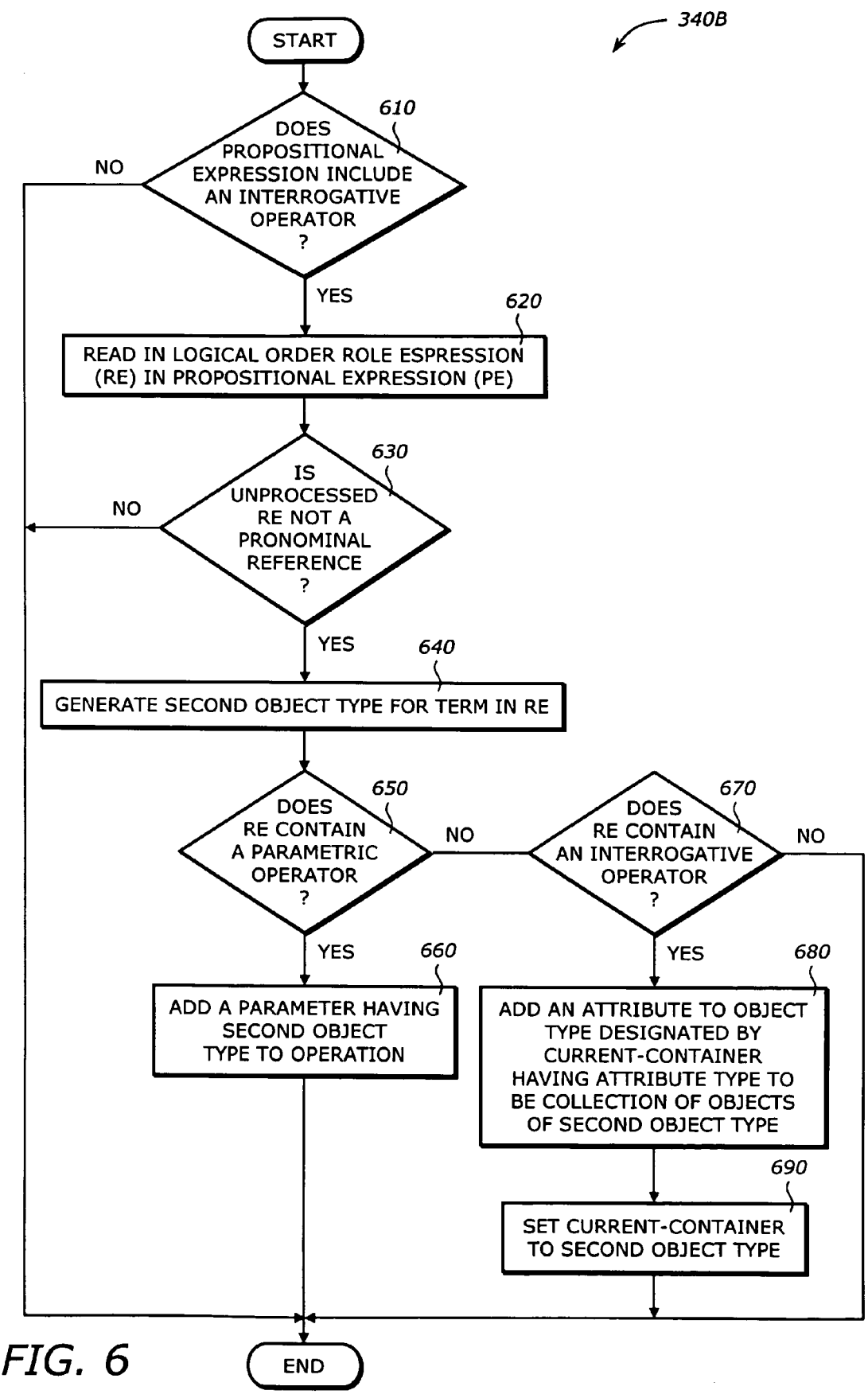
FIG. 6 is a flowchart illustrating a process to parse the propositional expression if the propositional expression includes an interrogative operator according to one embodiment of the invention.

FIG. 6 is a flowchart illustrating a process 340B to parse the propositional expression if the propositional expression includes an interrogative operator according to one embodiment of the invention.

Upon START, the process 340B determines if the PE includes an interrogative operator (Block 610). If not, the process 340B is terminated. Otherwise, the process 340B reads in logical order a role expression in the PE (Block 620). Next, the process 340B determines if the unprocessed role expression is not a pronominal reference (Block 630). If not, the process 340B is terminated. Otherwise, the process 340B generates a second object type for the term in the role expression (Block 640).

Then, the process 340B determines if the role expression contain a parametric operator (Block 650). If so, the process 340B adds a parameter having the second object type to the operation (Block 660) and is then terminated. Otherwise, the process 340B determines if the role expression contain an interrogative operator (Block 670). If not, the process 340B is terminated. Otherwise, the process 340B adds an attribute to the object type designated by the current container having an attribute type to be a collection of objects of the second object type (Block 680). Next, the process 340B sets the current container to the second object type (Block 690) and is then terminated.

Figure 7:
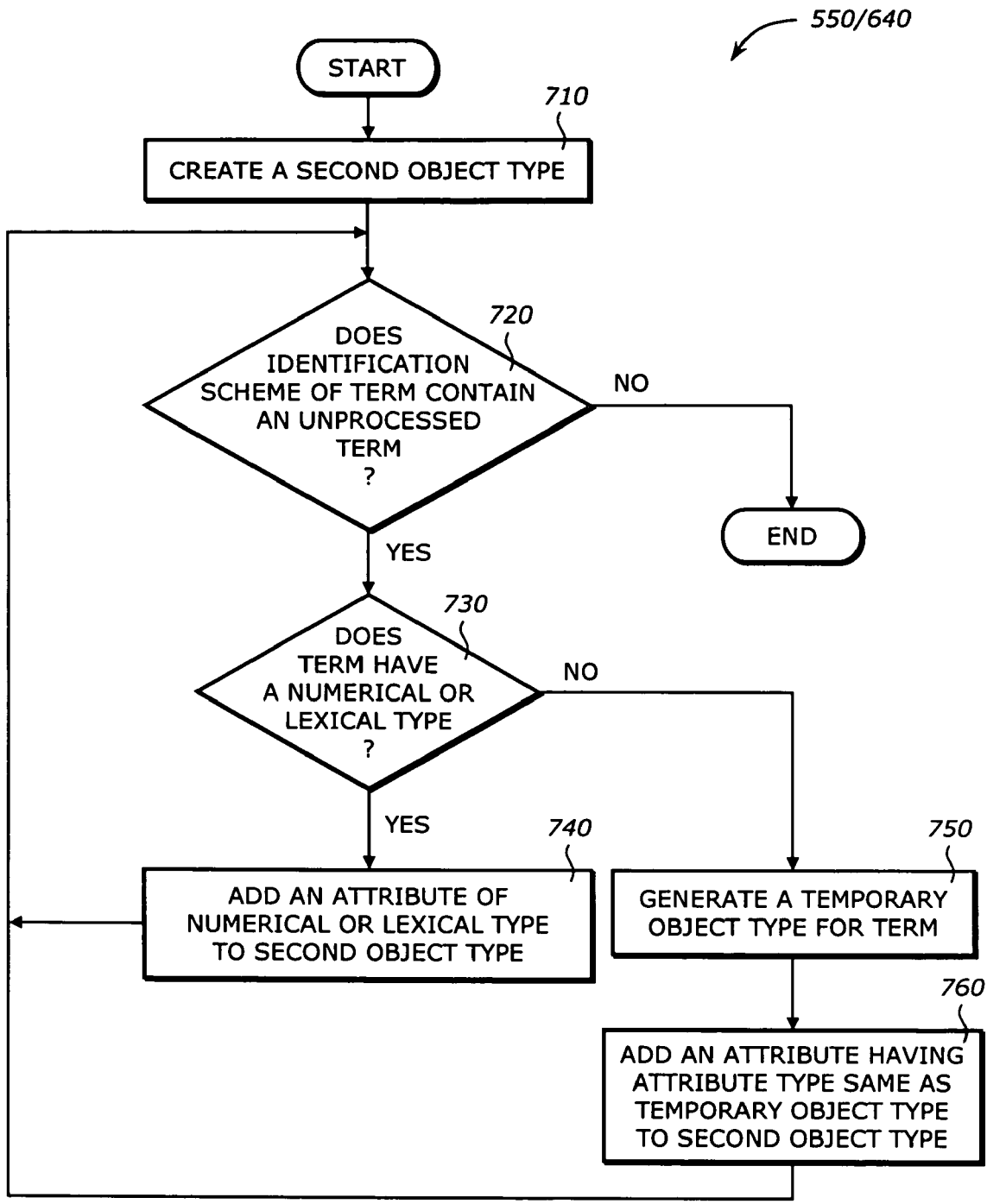
FIG. 7 is a flowchart illustrating a process to generate second object type for the term according to one embodiment of the invention.

FIG. 7 is a flowchart illustrating a process 550/640 to generate second object type for the term according to one embodiment of the invention.

Upon START, the process 550/640 creates a second object type (Block 710). Next, the process 550/640 determines if the identification scheme of the term contain an unprocessed term (Block 720). If not, the process 550/640 is terminated. Otherwise, the process 550/640 determines if the term has a numerical or lexical type (Block 730). If so, the process 550/640 adds an attribute of the numerical or lexical type to the second object type (Block 740) and returns to Block 720. Otherwise, the process 550/640 generates a temporary object type for the term (Block 750).

Next, the process 550/640 adds an attribute having an attribute type same as the temporary object type to the second object type (Block 760) and returns to Block 720.

The technique described above may be illustrated further by some examples. The examples in this section are based on the following vocabulary.

Vocabulary
agent
name
name is a role of text
customer
customer has name
identification criteria: customer is identified by name
meal preference
meal preference is a role of Text
customer has meal preference
departure date
departure date is a role of date
cruise
cruise has name
identification criteria: cruise is identified by name
customer has a reservation for cruise on departure date
location
city name
city name is a role of text
country name
country name is a role of text
location has city name
location has country name
identification criteria: location is identified by city name, country name
duration
duration is a role of integer
visit
visit is to location
visit is for duration
identification criteria: visit is identified by location, duration
cruise makes visit Authorization rule 1: Each agent is authorized to request whether a given customer has a reservation for a given cruise on a given departure date.

Authorization rule 2: Each agent is authorized to request what customer has a reservation for what cruise on a given departure date and whether the customer has a given meal preference.

Authorization rule 3: Each agent is authorized to request whether a given customer has a reservation for a given cruise on a given departure date and the customer has what meal preference.

Authorization rule 4: Each agent is authorized to request what customer has a reservation for a given cruise on a given departure date and the cruise makes what visit.

Interface for Authorization rule 1: Each agent is authorized to request whether a given customer has a reservation for a given cruise on a given departure date. The execution of the algorithm will result in the following OO interface:

Return-Object-Type GeneratedOperation(Customer-Type: customer, Cruise-Type cruise, Departure-Date-Type departure-date)

```
Class: Return-Object-Type {
        Boolean IsPropositionTrue
}
Class: Customer-Type {
        Text : name
}
Class Cruise-Type {
        Text: name
}
Class Departure-Date-Type {
        Date: date
}
```

Interface for Authorization rule 2: Each agent is authorized to request what customer has a reservation for what cruise on a given departure date and whether the customer has a given meal preference. The execution of the algorithm will result in the following OO interface:
Return-Object-Type GeneratedOperation(Departure-Date-Type departure-date, Meal-Preference-Type meal-preference)

```
Class: Return-Object-Type {
        Customer-Type-Collection: customer-type-collection
        Note: Customer-Type-Collection is a collection of Customer-Type
        objects.
}
Class: Customer-Type {
        Text : name
        Cruise-Type-Collection : cruise-type-collection
        Note: Cruise-Type-Collection is a collection of Cruise-Type objects.
        Boolean : has-meal-preference
}
Class Cruise-Type {
        Text: name
}
Class Meal-Preference-Type {
        Text: meal-type
}
```

Interface for Authorization rule 3: Each agent is authorized to request whether a given customer has a reservation for a given cruise on a given departure date and the customer has what meal preference. The execution of the algorithm will result in the following OO interface:
Return-Object-Type GeneratedOperation(Customer-Type: customer, Cruise-Type cruise, Departure-Date-Type departure-date)

```
Class: Return-Object-Type {
        Boolean IsPropositionTrue
        Meal-Preference-Type-Collection: meal-preference-type-
        collection
        Note: Meal-Preference-Type-Collection is a collection of Meal-
        Preference-Type objects.
}
Class: Customer-Type {
        Text : name
}
Class Cruise-Type {
        Text: name
}
Class Departure-Date-Type {
        Date: date
}
Class Meal-Preference-Type {
        Text: meal-type
}
```

Interface for Authorization rule 3: Each agent is authorized to request what customer has a reservation for a given cruise on a given departure date and the cruise makes what visit
Return-Object-Type GeneratedOperation(Cruise-Type cruise, Departure-Date-Type departure-date)

```
Class: Return-Object-Type {
        Customer-Type-Collection: customer-type-collection
        Note: Customer-Type-Collection is a collection of Customer-Type
        objects.
        Visit-Type-Collection: visit-type-collection
        Note: Visit-Type-Collection is a collection of Visit-Type objects.
}
Class Cruise-Type {
        Text: name
}
Class Departure-Date-Type {
        Date: date
}
Class: Customer-Type {
        Text : name
}
Class Visit-Type {
        Location-Type: location
        Integer: duration
}
Class Location-Type {
        Text : city-name
        Text : country-name
}
```

Figure 8:
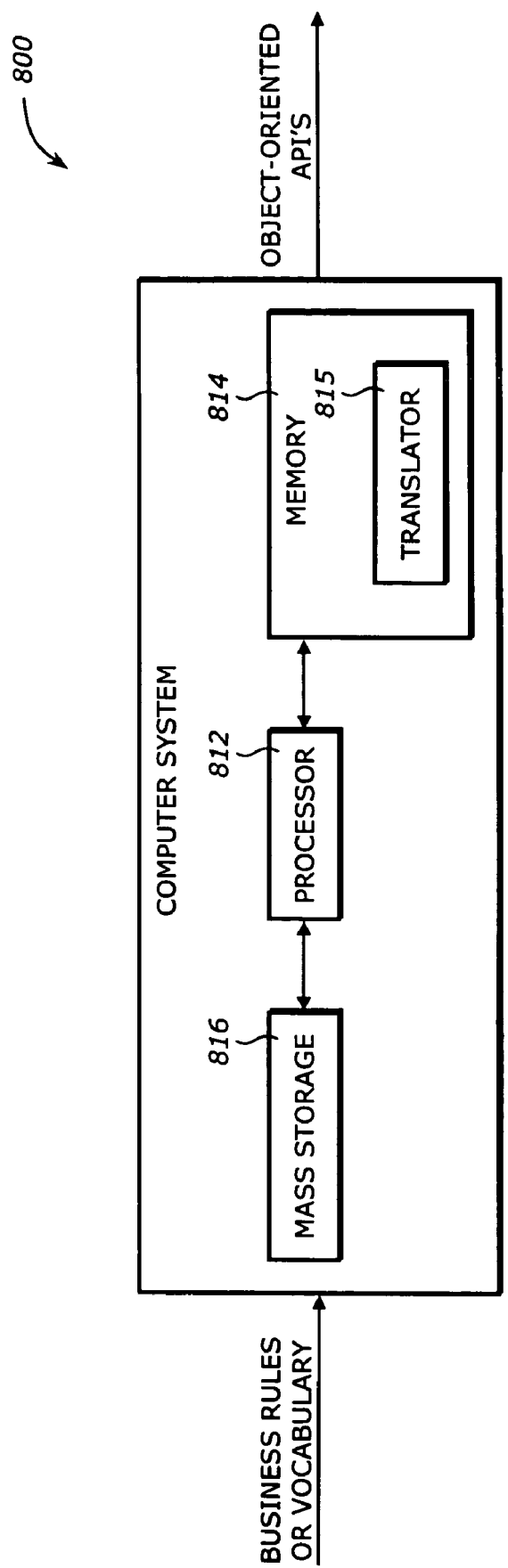
FIG. 8 is a diagram illustrating a computer system in which one embodiment of the invention can be practiced.

FIG. 8 is a diagram illustrating a computer system 800 in which one embodiment of the invention can be practiced.

The computer system 800 includes a processor 812, a memory 814, and a mass storage device 816. The computer system 800 receives a stream of input representing a set of business rules or vocabulary, processes the business rules or the vocabulary in accordance to the method of the present invention, and outputs an object-oriented API.

The processor 812 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The memory 814 stores system code and data. The memory 814 is typically implemented with dynamic random access memory (DRAM) or static random access memory (SRAM). The system memory may include program code or code segments implementing one embodiment of the invention. The memory 814 includes a translator module 815 of the present invention when loaded from mass storage 816. The translator module 815 implements all or part of the translator 120 shown in FIG. 1. The translator module 815 may also simulate the translation functions described herein. The translator module 815 contains instructions that, when executed by the processor 812, cause the processor to perform the tasks or operations as described above.

The mass storage device 816 stores archive information such as code, programs, files, data, databases, applications, and operating systems. The mass storage device 816 may include compact disk (CD) ROM, a digital video/versatile disc (DVD), floppy drive, and hard drive, and any other magnetic or optic storage devices such as tape drive, tape library, redundant arrays of inexpensive disks (RAIDs), etc. The mass storage device 816 provides a mechanism to read machine-accessible media. The machine-accessible media may contain computer readable program code to perform tasks as described above.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method for translating a business rule which authorizes a request for information into an application programming interface (API) expressed in object oriented objects, the business rule being in a linguistic form having a predefined syntax and the rule authorizing a request for information comprising one or more propositional expressions, the method comprising:
 receiving a stream of input representing a business rule and vocabulary;
 processing the received vocabulary to determine elements of the predefined syntax;
 creating an object type, wherein the object type corresponds to a return type of an operation in the rule authorizing a request for information;
 establishing a current container variable;
 for each propositional expression in the rule authorizing a request for information,
  setting the current container to be the object type,
  establishing a context for the propositional expression,
  processing the propositional expression in the rule authorizing a request for information, and
  recording the object type in the current container, the object type being a context resulting from processing the propositional expression;
 wherein establishing the context for the propositional expression comprises:
  for each pronominal reference in the propositional expression having a referent term which is a term in a previously processed propositional expression and which is not a subject of a parametric operator,
   if the referent term is not subject of an interrogative operator,
    setting the current container to be the object type that is the resulting context from the propositional expression having a referent term,
   otherwise, when the referent term is the subject of an interrogative operator,
    setting the current container to be object type generated for the referent term.

2. A method for translating a business rule which authorizes a request for information into an application programming interface (API) expressed in object oriented objects, the business rule being in a linguistic form having a predefined syntax and the rule authorizing a request for information comprising one or more propositional expressions, the method comprising:
 receiving a stream of input representing a business rule and vocabulary;
 processing the received vocabulary to determine elements of the predefined syntax;
 creating an object type, wherein the object type corresponds to return type of an operation in the rule authorizing a request for information;
 establishing a current container variable;
 for each propositional expression in the rule authorizing a request for information,
  setting the current container to be the object type,
  establishing a context for the propositional expression,
  processing the propositional expression in the rule authorizing a request for information, and
  recording the object type in the current container, the object type being a context resulting from processing the propositional expression;
 wherein processing the propositional expression comprises:
  parsing the propositional expression such that
   if a second propositional interrogative is applied to the propositional expression
    then parsing the propositional expression to which the second propositional interrogative is applied, and
   otherwise, when the propositional expression includes an interrogative operator then processing the propositional expression containing a term to which the interrogative operator is applied; and
 wherein parsing the propositional expression to which a propositional interrogative is applied comprises:
  for each role expression in the propositional expression that is not a pronominal reference and that includes no definite article or expression of a specifically referenced instance,
   when the role expression has a parametric operator,
    generating a second object type for a term in the role expression, and
    adding a parameter having the second object type to the operation; and
  processing the truthfulness of the propositional interrogative by adding a Boolean attribute to the object type designated by the current container to indicate a truth value of the propositional expression.

3. A method for translating a business rule which authorizes a request for information into an application programming interface (API) expressed in object oriented objects, the business rule being in a linguistic form having a predefined syntax and the rule authorizing a request for information comprising one or more propositional expressions, the method comprising:
 receiving a stream of input representing a business rule and vocabulary;
 processing the received vocabulary to determine elements of the predefined syntax;
 creating an object type, wherein the object type corresponds to a return type of an operation in the rule authorizing a request for information;
 establishing a current container variable;
 for each propositional expression in the rule authorizing a request for information,
  setting the current container to be the object type,
  establishing a context for the propositional expression,
  processing the propositional expression in the rule authorizing a request for information, and
  recording the object type in the current container, the object type being a context resulting from processing the propositional expression;
 wherein processing the propositional expression comprises:
  parsing the propositional expression such that
   if a second propositional interrogative is applied to the propositional expression
    then parsing the propositional expression to which the second propositional interrogative is applied, and
   otherwise, when the propositional expression includes an interrogative operator then processing the propositional expression containing a term to which the interrogative operator is applied; and wherein processing the propositional expression containing a term to which an interrogative operator is applied comprises:
for each role expression in the propositional expression that is not a pronominal reference,
generating a second object type for a term in the role expression;
if the role expression has a parametric operator,
adding a parameter having the second object type to the operation;
otherwise, when the role expression contains the interrogative operator,
adding an attribute to the object type designated by the current container having an attribute type to be a collection of objects of the second object type, and
setting the current container to the second object type.

4. The method of claim 3 wherein generating the second object type for the term comprises:
creating an instance of the second object type; and
for each term in an identification scheme of the term,
if the term has a numerical or lexical type,
then adding an attribute of the numerical or lexical type to the instance of the second object type;
otherwise, when the term has no numerical or lexical type,
generating a temporary object type for the term, and
adding an attribute having an attribute type to be same as the temporary object type to the instance of the second object type.

5. An article of manufacture comprising:
a machine-accessible storage medium including data that, when accessed by a machine, causes the machine to perform operation comprising the method of:
receiving a stream of input representing a business rule vocabulary;
processing the received vocabulary to determine elements of the predefined creating an object type, wherein the object type corresponds to a return type of an operation in the rule authorizing a request for information;
establishing a current container variable;
for each propositional expression in the rule authorizing a request for information,
setting the current container to be the object type,
establishing a context for the propositional expression,
processing the propositional expression in the rule authorizing a request for information, and
recording the object type in the current container, the object type being a context resulting from processing the propositional expression;
wherein the data causing the machine to perform processing the propositional expression comprises data that, when accessed by the machine, causes the machine to perform operation comprising:
parsing the propositional expression such that
if a second propositional interrogative is applied to the propositional expression
then parsing the propositional expression to which the second propositional interrogative is applied, and
otherwise, when the propositional expression includes an interrogative operator then processing the propositional expression containing a term to which the interrogative operator is applied; and wherein the data causing the machine to perform establishing the context for the propositional expression comprises data that, when accessed by the machine, causes the machine to perform operations comprising:
for each pronominal reference in the propositional expression having a referent term which is a term in a previously processed propositional expression and which is not a subject of a parametric operator,
if the referent term is not subject of an interrogative operator,
setting the current container to be the object type that is the resulting context from the propositional expression having a referent term,
otherwise, when the referent term is the subject of an interrogative operator,
setting the current container to be the object type generated for the Referent term.

6. An article of manufacture comprising:
a machine-accessible storage medium including data that, when accessed by a machine, causes the machine to perform operation comprising the method of:
receiving a stream of input representing a business rule and vocabulary;
processing the received vocabulary to determine elements of the predefined creating an object type, wherein the object type corresponds to a return type of an operation in the rule authorizing a request for information;
establishing a current container variable;
for each propositional expression in the rule authorizing a request for information,
setting the current container to be object type,
establishing a context for the propositional expression,
processing the propositional expression in the rule authorizing a request for information, and
recording the object type in the current container, the object type being a context resulting from processing the propositional expression;
wherein the data causing the machine to perform processing the propositional expression comprises data that, when accessed by the machine, causes the machine to perform operations comprising:
parsing the propositional expression such that
if a second propositional interrogative is applied to the propositional expression
then parsing the propositional expression to which the second propositional interrogative is applied, and
otherwise, when the propositional expression included an interrogative operator then processing the propositional expression containing a term to which the interrogative operator is applied; and
wherein the data causing the machine to perform parsing the propositional expression to which a propositional interrogative is applied comprises data that, when accessed by the machine, causes the machine to perform operations comprising:
for each role expression in the propositional expression that is not a pronominal reference and that includes no definite article or expression of a specifically referenced instance,
when the role expression has a parametric operator,
generating a second object type for a term in the role expression,
and adding a parameter having the second object type to the operation; and processing the truthfulness of the propositional interrogative by adding a Boolean attribute to the object type designated by the current container to indicate a truth value of the propositional expression.

7. An article of manufacture comprising:
a machine-accessible storage medium including data that, when accessed by a machine, causes the machine to perform operations comprising the method of:
receiving a stream of input representing a business rule and vocabulary;
processing the received vocabulary to determine elements of the predefined creating an object type, wherein the object type corresponds to a return type of an operation in the rule authorizing a request for information;
establishing a current container variable;
for each propositional expression in the rule authorizing a request for information,
setting the current container to be the object type,
establishing a context for the propositional expression,
processing the propositional expression in the rule authorizing a request for information, and
recording the object type in the current container, the object type being a context resulting from processing the propositional expression;
wherein the data causing the machine to perform processing the propositional expression comprises data that, when accessed by the machine, causes the machine to perform operations comprising:
parsing the propositional expression such that
if a second propositional interrogative is applied to the propositional expression
then parsing the propositional expression to which the second propositional interrogative is applied, and
otherwise, when the propositional expression includes an interrogative operator then processing the propositional expression containing a term to which the interrogative operator is applied; and
wherein the data causing the machine to perform processing the propositional expression comprises data that, when accessed by the machine, causes the machine to perform operation comprising:
for each role expression in the propositional expression that is not a pronominal reference,
generating a second object type for a term in the role expression;
if the role expression has a parametric operator
adding a parameter having the second object type to the operation;
otherwise, when the role expression contains the interrogative operator,
adding an attribute to the object type designated by the current container having an attribute type to be a collection of objects of the second object type, and setting the current container to the second object type.

8. The article of manufacture of claim 7 wherein the data causing the machine to perform generating the second object type for the term comprises data that, when accessed by the machine, causes the machine to perform operations comprising:
creating an instance of the second object type; and
for each term in an identification scheme of the term,
if the term has a numerical or lexical type,
then adding an attribute of the numerical or lexical type to the instance of the second object type;
otherwise, when the term has no numerical or lexical type,
generating a temporary object type for the term, and adding an attribute having an attribute type to be as the temporary object type to the instance of the second object type.

9. A system comprising:
a processor; and
a memory coupled to the processor, the memory containing instructions that, when executed by the processor, cause the processor to perform the method of:
receiving a stream of input representing a business rule and vocabulary;
processing the received vocabulary to determine elements of the predefined creating an object type, wherein the object type corresponds to return type of an operation in the rule authorizing a request for information;
establishing a current container variable;
for each propositional expression in the rule authorizing a request for information,
setting the current container to be the object type,
establishing a context for the proportional expression,
processing the propositional expression in the rule authorizing a request for information, and
recording the object type in the current container, the object type being a context resulting from processing the propositional expression;
wherein the instructions causing the processor to establish the context for the propositional expression comprises instructions that, when executed by the processor, cause the processor to:
for each pronominal reference in the propositional expression having a referent term which is a term in a previously processed propositional expression and which is not a subject of a parametric operator,
if the referent term is not subject of an interrogative operator
set the current container to be the object type that is the resulting context from the propositional expression having a referent term,
otherwise, when the referent term is subject of an interrogative operator, set the current container to be the object type generated for the referent term.

10. A system comprising:
a processor; and
a memory coupled to the processor, the memory containing instructions that, when executed by the processor, cause the processor to perform the method of:
receiving a stream of input representing a business rule and vocabulary;
processing the received vocabulary to determine elements of the predefined creating an object type, wherein the object type corresponds to a return type of an operation in the rule authorizing a request for information;
establishing a current container variable;
for each propositional expression in the rule authorizing a request for information,
setting the current container to be the object type,
establishing a context for the propositional expression,
processing the propositional expression in the rule authorizing a request for information, and
recording the object type in the current container, the object type being a context resulting from processing the propositional expression;
wherein the instructions causing the processor to process the propositional expression comprises instructions that, when executed by the processor, cause the processor to:

parse the propositional expression such that
if a second propositional interrogative is applied to the propositional expression
then parse the propositional expression to which the second propositional interrogative is applied, and
otherwise, when the propositional expression includes an interrogative operator then process the propositional expression containing a term to which the interrogative operator is applied; and
wherein the instructions causing the processor to parse the propositional expression comprises instructions that, when execute by the processor, cause the processor to:
for each role expression in the propositional expression that is not a pronominal reference and that includes no definite article or expression of a specifically referenced instance,
when the role expression has a parametric operator, generate a second object type for a term in the role expression, and
add a parameter having the second type to the operation; and
process the truthfulness of the propositional interrogative by adding a Boolean attribute to the object type designated by the current container to indicate a truth value of the propositional expression.

11. A system comprising:
a processor; and
a memory coupled to the processor, the memory containing instructions that, when executed by the processor, cause the processor to perform the method of:
receiving a stream of input representing a business rule and vocabulary;
processing the received vocabulary to determine elements of the predefined creating an object type, wherein the object type corresponds to a return type of an operation in the rule authorizing a request for information;
establishing a current container variable;
for each propositional expression in the rule authorizing a request for information,
setting the current container to be the object type,
establishing a context for the propositional expression,
processing the propositional expression in the rule authorizing a request for information, and
recording the object type in the current container, the object type being a context resulting from processing the propositional expression;
wherein the instructions causing the processor to process the propositional expression comprises instructions that, when executed by the processor, cause the processor to:
parse the propositional expression such that
if a second propositional interrogative is applied to the propositional expression
then parse the propositional expression to which the second propositional interrogative is applied, and
otherwise, when the propositional expression includes an interrogative operator then process the propositional expression containing a term to which the interrogative operator is applied; and
wherein the instructions causing the processor to process the propositional expression comprises instructions that, when executed by the processor, cause the processor to:
for each role expression in the propositional expression that is not a pronominal reference,
generate a second object type for a term in the role expression;
if the role expression has a parametric operator
add a parameter having the second object type to the operator;
otherwise, when the role expression contains the interrogative operator,
add an attribute to the object type designated by the current container having an attribute type to be a collection of object of the second object type, and
set the current container to the second object type.

12. The system of claim 11 wherein the instructions causing the processor to generate the second object type for the term comprises instructions that, when executed by the processor, cause the processor to:
create an instance of the second object type; and
for each term in an identification scheme of the term,
if the term has a numerical or lexical type,
then add an attribute of the numerical or lexical type to the instance of the second object type,
otherwise, when the term has no numerical or lexical type,
generate a temporary object type for the term; and
add an attribute having an attribute type to be same as the temporary object type to the instance of the second object type.

* * * * *